United States Patent [19]

Akiyoshi

[11] Patent Number: 5,056,906

[45] Date of Patent: Oct. 15, 1991

[54] PRESCRIPTION LENS ATTACHMENT FOR SUNGLASSES

[76] Inventor: Min Akiyoshi, 817 Oak Ave., Davis, Calif. 95616

[21] Appl. No.: 527,835

[22] Filed: May 24, 1990

[51] Int. Cl.⁵ .............................................. G02C 7/08
[52] U.S. Cl. ........................................ 351/57; 351/47
[58] Field of Search ................. 351/44, 47, 57; 2/444, 2/445

[56] References Cited

U.S. PATENT DOCUMENTS

| | | |
|---|---|---|
| D. 203,949 | 3/1966 | Dym . |
| 1,130,634 | 3/1915 | Rooney . |
| 1,561,958 | 11/1925 | Tully . |
| 1,587,131 | 6/1926 | Tillyer . |
| 1,923,567 | 8/1933 | Baker . |
| 2,951,418 | 9/1960 | Bitner et al. . |
| 3,427,098 | 2/1969 | Johnston . |
| 3,890,037 | 6/1975 | Zingarelli . |
| 4,070,103 | 1/1978 | Meeker . |
| 4,338,004 | 7/1982 | Vosper . |

*Primary Examiner*—Paul M. Dzierzynski
*Attorney, Agent, or Firm*—Thomas R. Lampe

[57] ABSTRACT

Prescription lenses are detachably applied to sunglasses by securing the lenses between lens holder elements of a prescription lens holder and attaching the lens holder to the sunglass frame.

10 Claims, 2 Drawing Sheets

PRESCRIPTION LENS ATTACHMENT FOR SUNGLASSES

TECHNICAL FIELD

The present invention relates to an arrangement whereby conventional non-prescription sunglasses may be retrofitted and employed in association with prescription lenses. The apparatus includes a prescription lens holder which may readily be attached to or detached from a sunglass frame whereby the same prescription lenses may be selectively utilized with a variety of sunglasses.

BACKGROUND ART

U.S. Pat. No. 1,923,567 discloses an ophthalmic mounting arrangement which allows individual prescription lenses to be selectively applied to goggles. Each prescription lens is separately manually positioned in or removed from clips which comprise part of the goggles. Since the prescription lenses must be handled directly during application or removal there is considerable likelihood that they will be damaged. Furthermore, the means for mounting the individual prescription lenses is an integral part of the goggle construction, considerably adding to goggle cost and complexity. There is no showing in U.S. Pat. No. 1,923,567 of an approach whereby prescription lenses may be readily applied to and removed from conventional sunglasses. U.S. Pat. Nos. 1,561,958 and 1,587,131 have similar deficiencies.

Applicant is also aware of prior art arrangements which purportedly convert spectacles or eyeglasses into a pair of sunglasses. This, of course, is quite opposed to the present arrangement which allows for the ready application of prescription lenses to sunglasses. In any event, U.S. Pat. No. 3,890,037 discloses an arrangement allowing for the attachment of tinted flexible plastic lenses to a pair of spectacles. More particularly, the lenses are individually press fit into the rear face of a spectacle frame. Such an arrangement requires individual manual handling of the tinted lenses and the spectacle frames must be machined in a highly precise manner to permit application of the tinted lenses. This, of course, greatly adds to cost. U.S. Pat. No. 3,427,098 also relates to a sun shade attachment for eyeglasses and the device disclosed therein suffers from the same deficiencies as the device shown in U.S. Pat. No. 3,890,037. Yet another arrangement of this same general type is disclosed in U.S. Pat. No. 4,338,004.

U.S. Pat. No. 4,070,103 discloses the use of lens rim covers which may come in a variety of sizes, shapes, and designs and which may be selectively attached to or removed from a conventional spectacle frame to provide different appearances.

Of even less pertinence to the present invention are the arrangements shown in U.S. Pat. No. 1,130,634 disclosing arrangement for attaching a shield to spectacles, U.S. Pat. No. 2,951,418 disclosing a complex corrective lens holder for a face mask, and U.S. Pat. No. Des. 203,949 disclosing a safety lens attachment design for eyeglasses.

By way of contrast with the arrangements disclosed in the above-identified patents, the apparatus of the present invention allows for the simultaneous application of two prescription lenses to sunglasses of conventional construction. The prescription lenses may be attached to or removed from the sunglasses without the user having to directly touch the prescription lenses, possibly causing damage thereto.

Furthermore, apparatus constructed in accordance with the teachings of the present invention is simple, light-weight and low cost. With the present approach, prescription lenses may be utilized in conjunction with a wide variety of sunglass styles, including popular designer styles. Only a very slight modification need be made to the sunglasses to permit their conversion to prescription lens use.

BRIEF SUMMARY OF THE INVENTION

Apparatus constructed in accordance with the teachings of the present invention includes a pair of sunglasses including a sunglass frame and tinted sunglass elements connected to the frame.

The structural combination also includes a prescription lens holder including two pairs of prescription lens holder elements. The prescription lens holder elements of each pair of prescription lens holder elements are spaced from each other and disposed in a common plane.

A prescription lens is disposed between the lens holder elements of at least one of the pairs of prescription lens holder elements. Securement means is provided for securing the prescription lens in fixed position between the lens holder elements. Attachment means is provided for attaching the prescription lens holder to the sunglass frame whereby the prescription lens is disposed behind a tinted sunglass element.

The prescription lens holder additionally includes a plurality of projections. These projections are positioned in notches formed in the sunglass frame. The projections include upper ends and lower ends which bear against the sunglass frame adjacent to said notches.

The prescription lens has opposed grooves formed in the outer peripheral surface thereof. The prescription lens holder elements are in the form of elongated retention members positionable in the grooves. The retention members are so configured as to maintain the prescription lens in fixed position relative thereto.

Other features, advantages, and objects of the present invention will become apparent with reference to the following detailed description and accompanying drawings.

BEST MODE FOR CARRYING OUT THE INVENTION

Figure 1:
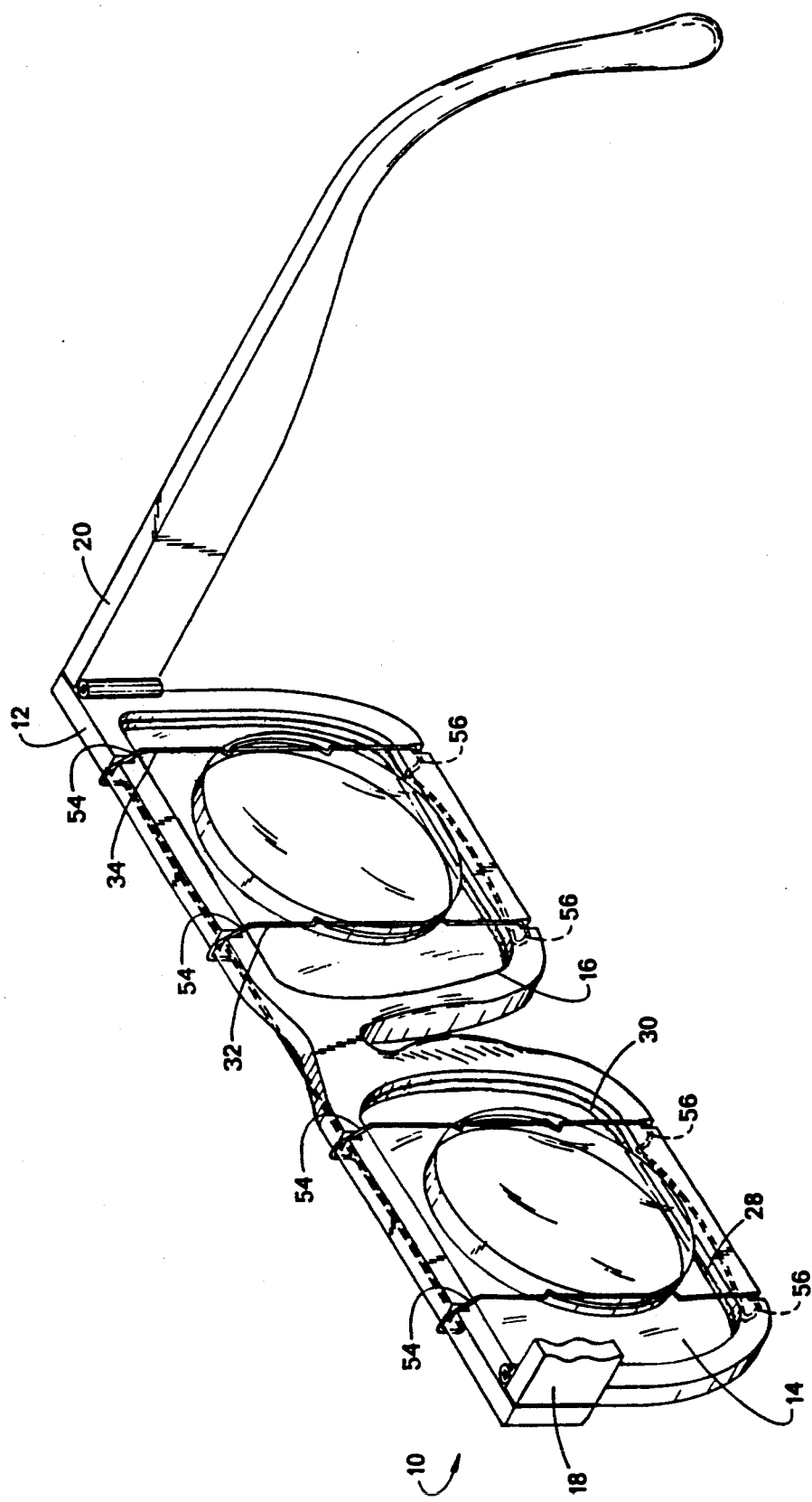
FIG. 1 is a perspective view of the preferred form of apparatus constructed in accordance with the teachings of the present invention.
Figure 2:
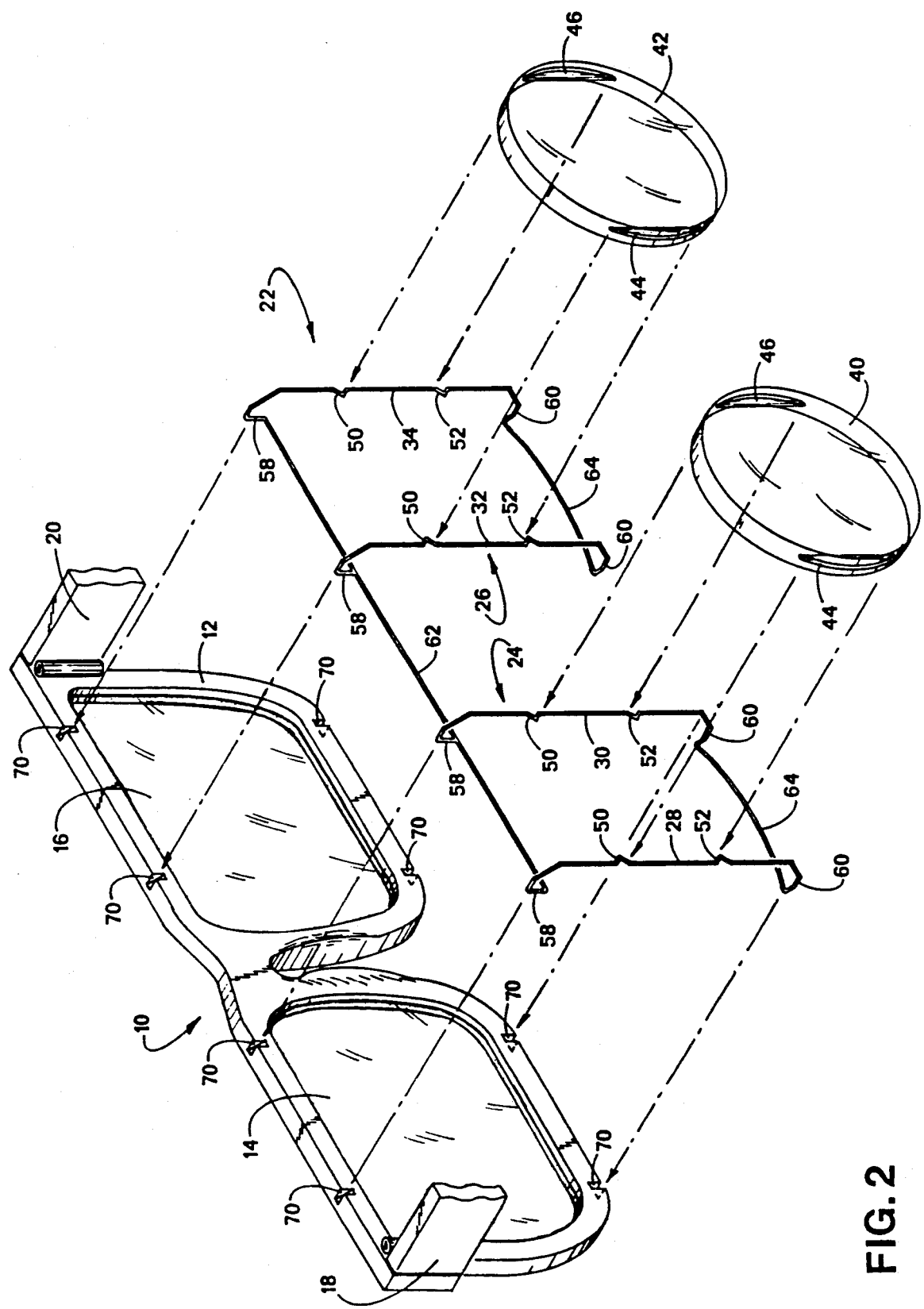
FIG. 2 is a view similar to FIG. 1, but illustrating the structural components of the apparatus in exploded format.

Referring now to the drawings, sunglasses are generally designated by reference numeral 10. As is conventional, sunglasses 10 include a sunglass frame 12 and tinted sunglass elements 14, 16 disposed within the frame. Also as is conventional, the sunglasses 10 include a pair of ear pieces 18, 20 pivotally connected to the frame by hinges. In FIG. 1, ear piece 18 is shown broken away and in FIG. 2 both ear pieces 18 and 20 are shown broken away for the purpose of facilitating disclosure.

Apparatus constructed in accordance with the teachings of the present invention also includes a prescription lens holder 22 which, as may readily be seen, in the disclosed embodiment is of unitary construction and formed of relatively thin gauge wire. The various elements of the lens holder may be fabricated and secured together utilizing conventional techniques.

Prescription lens holder 22 includes two pairs 24, 26 of prescription lens holder elements. Pair 24 includes prescription lens holder elements 28, 30 and pair 26 includes lens holder elements 32, 34. The prescription lens holder elements comprise elongated retention members for retaining prescription lenses 40, 42 in the manner illustrated in FIG. 1. More specifically, it is to be noted that each of the prescription lenses has opposed grooves 44, 46 formed in the outer peripheral surface thereof. The lens holder elements of each pair of lens holder elements are positionable in the grooves 44, 46, as is shown most clearly in FIG. 1. It will be appreciated that the lens holder elements may be temporarily manually deformed from their configuration illustrated in FIGS. 1 and 2 to allow for their insertion into the grooves but that the lens holder elements will spring back toward such configuration to retain the lenses therebetween.

Each elongated retention member or lens holder element defines a pair of spaced bight segments 50, 52. When the lenses are disposed between the elongated retention elements and such elements are positioned in grooves 44, 46, bight segments 50, 52 engage the outer periphery of the lens adjacent to said grooves to maintain the prescription lenses in fixed position relative to the elongated retention members. Also, the grooves and elongated retention members cooperate to prevent rotation of the lenses because the elongated retention members bear against a substantially straight lens surface within said grooves.

After the prescription lenses 40, 42 are attached to the prescription lens holder 22 in the manner just described, the holder is applied to the frame 12 of sunglasses 10. When applied to the frame the holder and prescription lenses assume the positions relative to the frame illustrated in FIG. 1. The structure for providing such attachment will now be described.

Prescription lens holder 22 includes a plurality of projections including upper projections 54 and lower projections 56. Essentially, the projections are extensions of the prescription lens holder elements, being bent outwardly as illustrated. Upper projections 54 include outwardly and downwardly projecting upper ends 58 and lower projections 56 include outwardly and upwardly directed lower ends 60.

An upper elongated structural element 62 is connected to all of the projection upper ends 58. A pair of lower elongated structural elements 64 extend between the prescription lens holder elements of each of the pairs of prescription lens holder elements. The lower elongated structural elements have, as shown, an inwardly directed bowed configuration.

Because of the somewhat flexible and resilient nature of the wire utilized in the construction of prescription lens holder 22, application of suitable forces thereto will result in flexing of the holder so that projections 54, 56, and consequently structural elements 62, 64, will clear the frame and allow the ends and structural elements to be snapped over same and resiliently bear thereagainst. Removal of the holder and lenses held thereby from the frame is just as simple and straight-forward.

It will be appreciated that once in the holder the prescription lenses 40, 42 need not be touched during either application or removal. It will be further appreciated that the lenses are applied or removed as a set. This is not only convenient but will ensure that the prescription lenses will be maintained in their proper relationship, not only with respect to one another but also with respect to the holder 22. Also, as indicated above, since the lenses cannot be rotated within the holder, they will maintain their correct orientation.

It is preferred that notches 70 be formed in frame 12, said notches accommodating upper projections 54 and lower projections 56. This structural interrelationship will prevent the holder 22 (and thus the lenses 40, 42) from sliding endwise relative to the frame. Formation of these notches is a very simple matter, being accomplished for example by use of a file. Because the notches are disposed inwardly, i.e. in the direction of the wearer, they will not be readily observed.

We claim:

1. Apparatus comprising, in combination:
   sunglasses including a sunglass frame and tinted sunglass elements connected to said frame;
   a prescription lens holder including two pairs of prescription lens holder elements, said prescription lens holder elements of each pair of prescription lens holder elements being spaced from each other and disposed in a common plane;
   a prescription lens disposed between the lens holder elements of at least one of said pairs of prescription lens elements;
   securement means for securing said prescription lens in fixed position between said lens holder elements; and
   attachment means for removably attaching said prescription lens holder to said sunglass frame whereby said prescription lens is disposed behind a tinted sunglass element.

2. Apparatus according to claim 1 wherein said sunglass frame has a plurality of notches formed therein and wherein said prescription lens holder additionally includes a plurality of projections for positioning in said notches, said notches and said projections at least partially comprising said attachment means.

3. Apparatus according to claim 1 wherein said prescription lens defines opposed grooves in the outer peripheral surface thereof, said prescription lens holder elements comprising elongated retention members positionable in said grooves, said grooves and said elongated retention members at least partially comprising said securement means.

4. Apparatus according to claim 1 wherein said prescription lens holder comprises a wire framework of light-weight, unitary construction.

5. Apparatus according to claim 2 wherein said projections include outwardly and downwardly projecting upper ends and outwardly and upwardly projecting lower ends, said ends bearing against said sunglass frame adjacent to said notches.

6. Apparatus according to claim 5 wherein said prescription lens holder additionally includes an upper elongated structural element connected to all of said projection upper ends and engageable with said sunglass frame between said notches.

7. Apparatus according to claim 5 wherein said prescription lens holder additionally includes a pair of lower elongated structural elements, each of said lower elongated structural elements engageable with said sunglass frame and extending between the prescription lens holder elements of one of said pairs of prescription lens holder elements.

8. Apparatus according to claim 7 wherein each of said lower elongated structural elements have an inwardly directed bowed configuration for resilient engagement with said sunglass frame.

9. Apparatus according to claim 3 wherein each of said elongated retention members is formed of wire and defines a pair of spaced bight segments engageable with the outer periphery of a prescription lens adjacent to said grooves to maintain said prescription lens in fixed position relative to said elongated retention members.

10. Apparatus according to claim 9 wherein said elongated retention members bear against a substantially straight prescription lens surface within said grooves to prevent rotation of said prescription lens.

* * * * *